US012023792B2

(12) United States Patent
Teng et al.

(10) Patent No.: US 12,023,792 B2
(45) Date of Patent: Jul. 2, 2024

(54) IMPACT TOOL HAVING EXCHANGEABLE HANDLE STRUCTURE

(71) Applicant: MOBILETRON ELECTRONICS CO., LTD., Taichung (TW)

(72) Inventors: Cheng-I Teng, Taichung (TW); Tung-Chin Kuo, Taichung (TW)

(73) Assignee: MOBILETRON ELETRONICS CO., LTD., Taichung (TW)

( * ) Notice: Subject to any disclaimer, the term of this patent is extended or adjusted under 35 U.S.C. 154(b) by 11 days.

(21) Appl. No.: 18/097,318

(22) Filed: Jan. 16, 2023

(65) Prior Publication Data

US 2023/0234201 A1 Jul. 27, 2023

(30) Foreign Application Priority Data

Jan. 26, 2022 (TW) ................................. 111103377

(51) Int. Cl.
*B25D 17/04* (2006.01)

(52) U.S. Cl.
CPC ........ *B25D 17/04* (2013.01); *B25D 2250/121* (2013.01)

(58) Field of Classification Search
CPC .......................... B25D 17/04; B25D 2250/121
USPC ............................................... 173/162.2, 217
See application file for complete search history.

(56) References Cited

U.S. PATENT DOCUMENTS

| | | | | |
|---|---|---|---|---|
| 10,646,986 | B2 * | 5/2020 | Teranishi | B25D 17/24 |
| 11,926,030 | B2 * | 3/2024 | Yoshikane | B25D 11/06 |
| 2008/0210447 | A1 * | 9/2008 | Robieu | B25F 5/006 173/29 |
| 2009/0188691 | A1 * | 7/2009 | Hahn | B25D 17/043 173/162.2 |
| 2020/0180124 | A1 * | 6/2020 | Ellice | B25F 5/026 |
| 2023/0121902 | A1 * | 4/2023 | Nakashima | B25F 5/026 173/162.1 |

* cited by examiner

*Primary Examiner* — Michelle Lopez
(74) *Attorney, Agent, or Firm* — Apex Juris, pllc; Hilde M. L. Coeckx

(57) ABSTRACT

An impact tool having an exchangeable handle structure includes an impact tool main body. A rear-end portion of the impact tool main body forms an engaging portion having two lugs respectively on a top surface and a bottom surface and an annular body on a rear-end surface. Two penetrated portions respectively extend from a top side and a bottom side of the annular body. A left-half part and a right-half part of a front-end portion of a casing cover the lugs and the annular body. A plurality of fixing members respectively passes through the lugs, arm casings formed by the casing, the penetrated portions, and a rear annular casing of the casing. The impact tool main body is detachably engaged with a handle device through the engaging portion.

10 Claims, 12 Drawing Sheets

IMPACT TOOL HAVING EXCHANGEABLE HANDLE STRUCTURE

BACKGROUND OF THE INVENTION

Technical Field

The present invention relates generally to an impact tool structure, and more particularly to an impact tool having an exchangeable handle structure.

Description of Related Art

A conventional impact tool, such as an impact drill or an impact driver, is a device with a handle directly connected to a rear end of a main body, wherein a trigger is provided on a front of the handle. A motor in the main body is activated when the trigger is pressed, allowing the motor to drive an impact mechanism of a front end of a reducing mechanism through the reducing mechanism. An output head of a front end of the impact mechanism is connected to a sleeve or is engaged with a drill through an adapter.

Although the conventional impact tool could tighten a fixing member or drill, as the handle and the main body are integrally formed as a monolithic unit, two different sets of molds and materials are required for manufacturing a gun-type impact tool having a short structure or a longer structure, thereby increasing the production cost and requiring to prepare more materials due to the uncommon design.

BRIEF SUMMARY OF THE INVENTION

In view of the above, the primary objective of the present invention is to provide an impact tool, which allows different types of handles to be mounted on the same impact tool main body through a detachable structure between the handle and the impact tool main body, thereby flexibly manufacturing different types of the impact tool and reducing the production cost.

The present invention provides an impact tool having an exchangeable handle structure, including an impact tool main body and a handle device. The impact tool main body has an outer casing, wherein an impact mechanism, a reducer, and a motor are engaged in the outer casing in order along a front-rear direction from front to back. A front end of the impact mechanism is engaged with an output head forwardly penetrating out of the outer casing. A rear-end portion of the outer casing forms an engaging portion, wherein a middle of a top surface of the engaging portion has a top lug, and a middle of a bottom surface of the engaging portion has a bottom lug. The top lug has a first through hole, and the bottom lug has a second through hole. A rear-end surface of the engaging portion has an annular body, wherein two penetrated portions respectively extend upward from a middle of a top side and extend downward from a middle of a bottom side of the annular body, and respectively have a third through hole.

The handle device has a top arm casing, a bottom arm casing, and a rear annular casing connected between the top arm casing and the bottom arm casing. A left-half part of the top arm casing, a left-half part of the bottom arm casing, and a left-half part of the rear annular casing is classified as a left casing, and a right-half part of the top arm casing, a right-half part of the bottom arm casing, and a right-half part of the rear annular casing are classified as a right casing for being engaged with the left casing. The rear annular casing is connected to a handle, wherein a triggering member is electrically connected to the motor, is adapted to control the motor, and is provided on the handle. The top arm casing covers a top side of the engaging portion and the top lug and has two top fixing cylinders therein, wherein the two top fixing cylinders respectively abut against a left side and a right side of the top lug. The bottom arm casing covers a bottom side of the engaging portion and the bottom lug and has two bottom fixing cylinders therein, wherein the two bottom fixing cylinders respectively abut against a left side and a right side of the bottom lug. The rear annular casing is adapted to receive the annular body and the two penetrated portions therein and has two pairs of rear fixing cylinders. Each pair of rear fixing cylinders abuts against a left side and a right side of one of the two penetrated portions. A plurality of fixing members respectively passes through the two top fixing cylinders and the first through hole, the two bottom fixing cylinders and the second through hole, and each pair of rear fixing cylinders and the corresponding third through hole for engaging.

With the aforementioned design, the front-end portion of the handle device is detachably engaged with the engaging portion of the impact tool main body, wherein the left-half part and the right-half part of the front-end portion of the handle device are engaged on the top lug, the bottom lug, and the two penetrated portions of the engaging portion, and the top lug, the bottom lug, and the two penetrated portions are taken as the supporting point for engaging and fixing. By working with the top arm casing and the bottom arm casing abutting against the surface of the engaging portion, the handle device could be firmly engaged with the engaging portion of the impact tool main body.

As the impact tool main body and the handle device could be respectively and independently manufactured, different types of the handle device could be mounted on the impact tool main body having the same structure to form different types of the impact tool, thereby the impact tool main body could be commonly used during production, reducing the number of materials and molds and the production cost through flexible manufacture upon the required demand for assembling different types of the impact tool.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
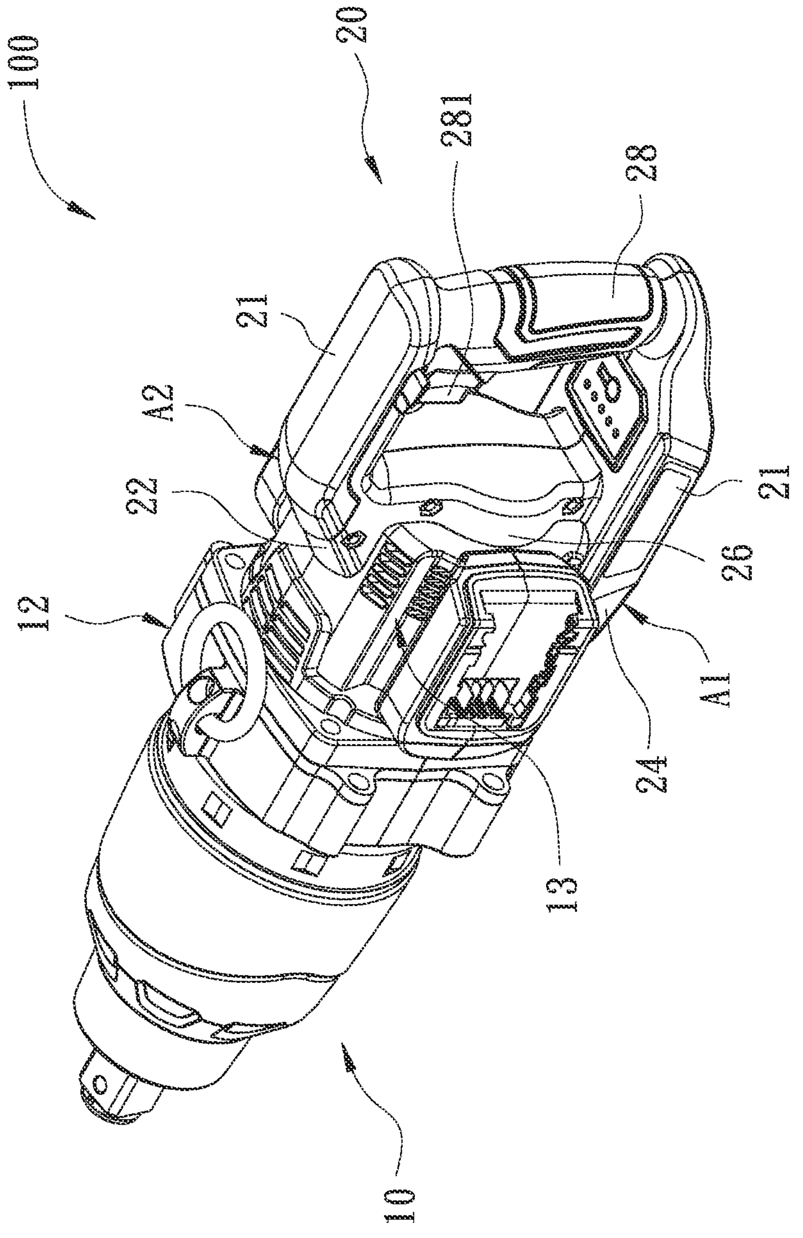
FIG. 1 is a perspective view of the impact tool having the exchangeable handle structure according to a first embodiment of the present invention.

An impact tool 100 having an exchangeable handle structure according to a first embodiment of the present invention is illustrated in FIG. 1 to FIG. 5 and includes an impact tool main body 10 and a handle device 20 detachably engaged with the impact tool main body 10. The handle device 20 is classified as a gun type and an upright type. Through selectively mounting the gun-type or the upright-type handle device 20 on a rear end of the impact tool main body 10, the gun-type or the upright-type impact tool 100 having the exchangeable handle structure could be assembled. The handle device 20 according to the first embodiment of the present invention is the gun-type.

The impact tool main body 10 has an outer casing 12. An impact mechanism 14, a reducer 15, and a motor 16 are engaged in the outer casing 12 in order along a front-rear direction from front to back. A front end of the impact mechanism 14 is engaged with an output head 141 forwardly penetrating out of the outer casing 12. A rear-end portion of the outer casing 12 forms an engaging portion 13, wherein a top surface and a bottom surface of the engaging portion 13 in a top-bottom direction that is perpendicular to the front-rear direction respectively are a curved surface. In other embodiments, the top surface and the bottom surface of the engaging portion 13 could respectively be a flat surface.

A middle of the top surface of the engaging portion 13 has a top lug 131, and a middle of the bottom surface of the engaging portion 13 has a bottom lug 132, wherein the top lug 131 has a first through hole 1311 extending along a left-right direction that is perpendicular to the front-rear direction and the top-bottom direction, and the bottom lug 132 has a second through hole 1321 extending along the left-right direction. A rear-end surface of the engaging portion 13 is a vertical surface perpendicular to the front-rear direction, and a center of the rear-end surface of the engaging portion 13 has an annular body 133 protruding rearward, wherein a center of the annular body 133 and an axis of the impact tool main body 10 are coaxial. Two penetrated portions 134 respectively extend upward from a middle of a top side and extend downward from a middle of a bottom side of the annular body 133, and respectively have a third through hole 1341 extending along the left-right direction.

The handle device 20 includes a left casing A1 and a right casing A2 that are engaged with each other to form a casing A, wherein the casing A has a top arm casing 22, a bottom arm casing 24, and a rear annular casing 26, wherein a left-half part of the top arm casing 22, a left-half part of the bottom arm casing 24, and a left-half part of the rear annular casing 26 are classified as the left casing A1, and a right-half part of the top arm casing 22, a right-half part of the bottom arm casing 24, and a right-half part of the rear annular casing 26 are classified as the right casing A2. The rear annular casing 26 is connected between a rear end of the top arm casing 22 and a rear end of the bottom arm casing 24, and is rearwardly connected to a handle 28. A triggering member 281 electrically connected to the motor 16 is provided on the handle 28. Through pressing the triggering member 281, the motor 16 drives the reducer 15 and the impact mechanism 14 to drive the output head 141 of the front end of the impact mechanism 14 to rotate.

The top arm casing 22 has an opening bottomward, covers a top side of the engaging portion 13 and the top lug 131, and has two top fixing cylinders 221 therein, wherein the two top fixing cylinders 221 are respectively provided in the left casing A1 and the right casing A2, and respectively abut against a left side and a right side of the top lug 131. The bottom arm casing 24 has an opening on a top, covers a bottom side of the engaging portion 13 and the bottom lug 132, and has two bottom fixing cylinders 241 therein, wherein the two bottom fixing cylinders 241 are respectively provided in the left casing A1 and the right casing A2, and respectively abut against a left side and a right side of the bottom lug 132.

The rear annular casing 26 has an opening frontward, is adapted to receive the annular body 133 and the two penetrated portions 134 therein, and has two pairs of rear fixing cylinders 261 therein, wherein each pair of rear fixing cylinders 261 is respectively provided in the left casing A1 and the right casing A2, and respectively abuts against a left side and a right side of one of the penetrated portions 134. A plurality of fixing members B respectively passes through the two top fixing cylinders 221 and the first through hole 1311, the two bottom fixing cylinders 241 and the second through hole 1321, and each pair of rear fixing cylinders 261 and the corresponding third through hole 1341 for engaging. In the current embodiment, each of the fixing members B is a bolt and nut assembly.

Figure 2:
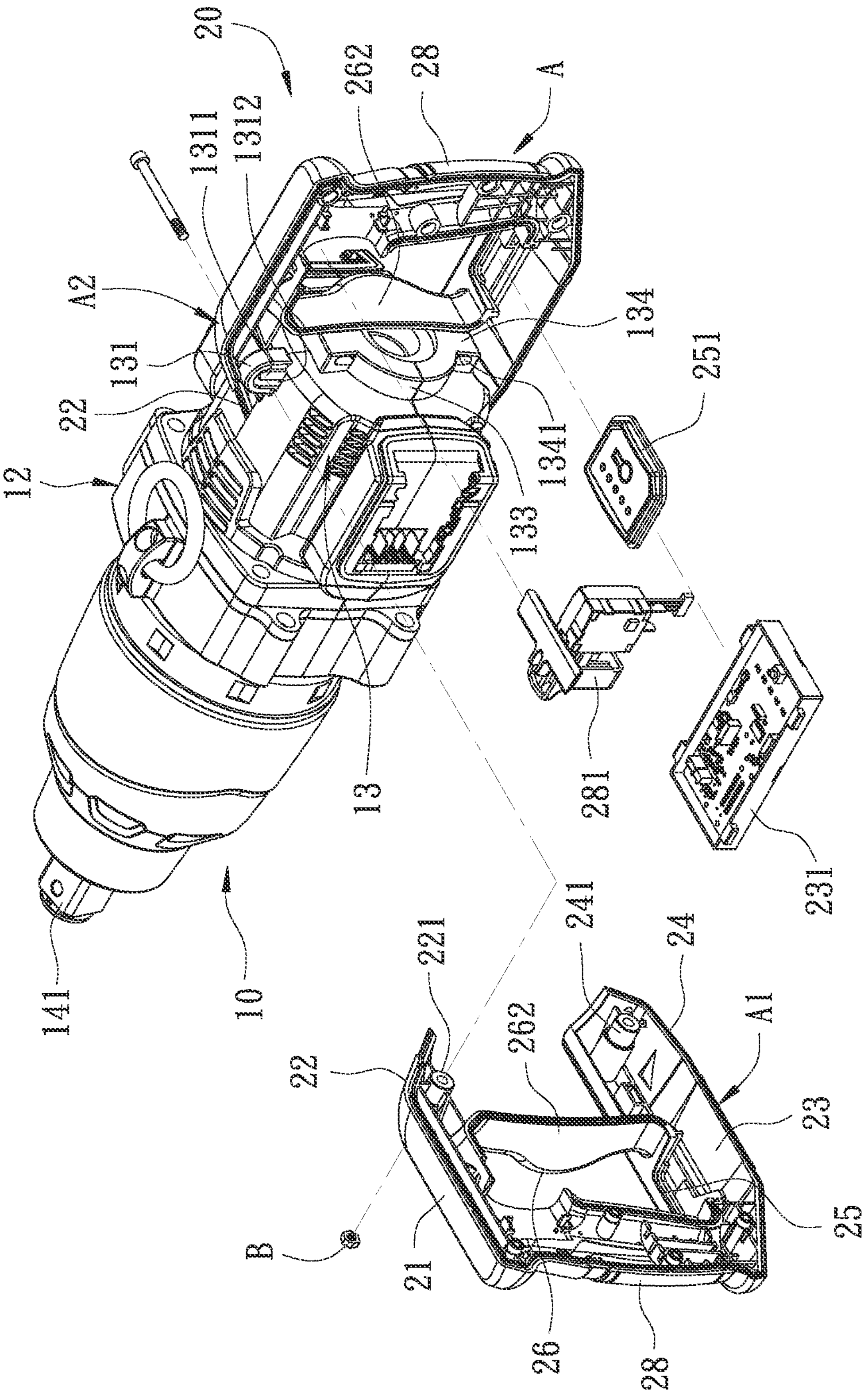
FIG. 2 is a schematic view, showing the left casing according to the first embodiment of the present invention being exploded.
Figure 3:
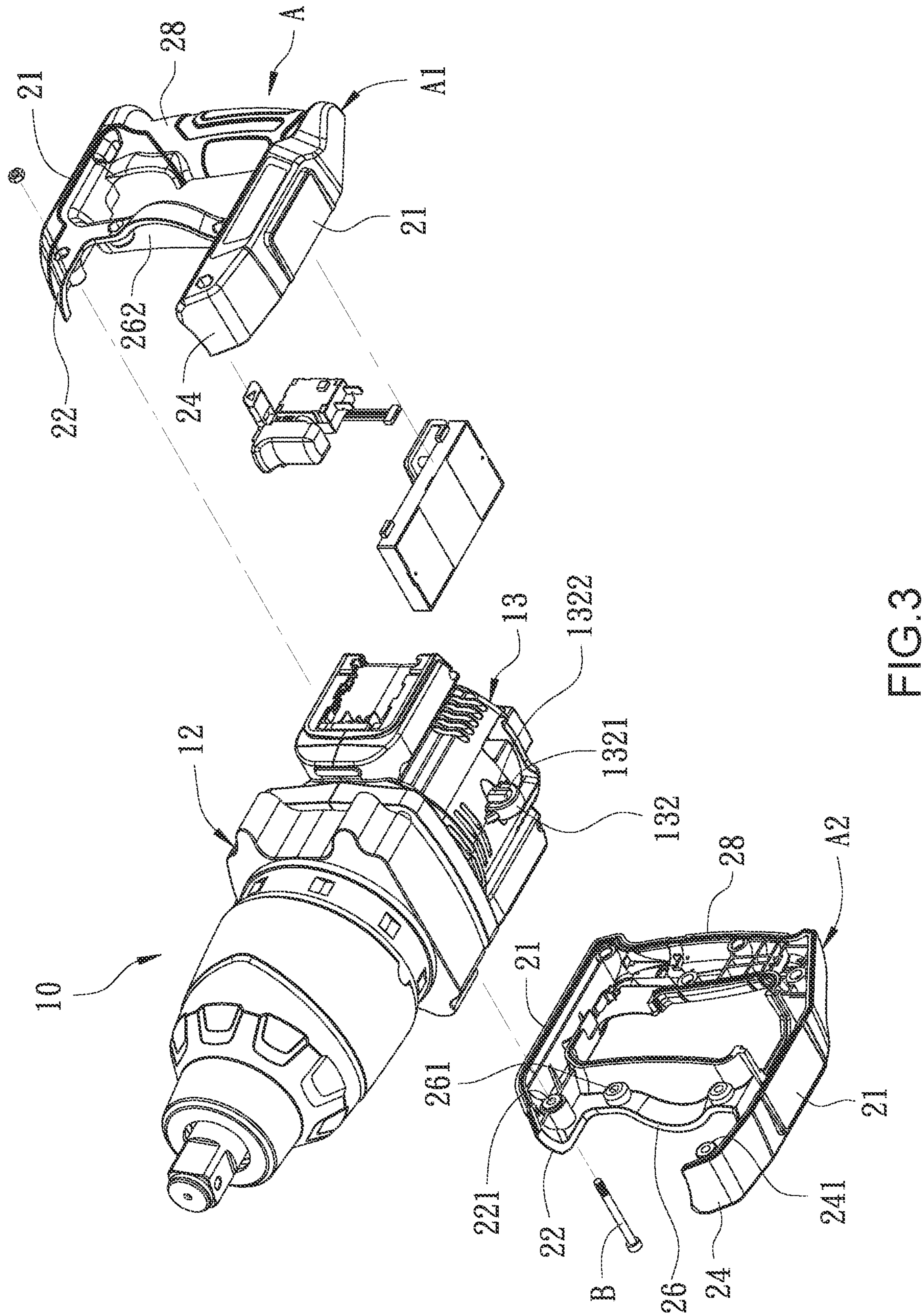
FIG. 3 is a schematic view, showing the handle device according to the first embodiment of the present invention being exploded.
Figure 4:
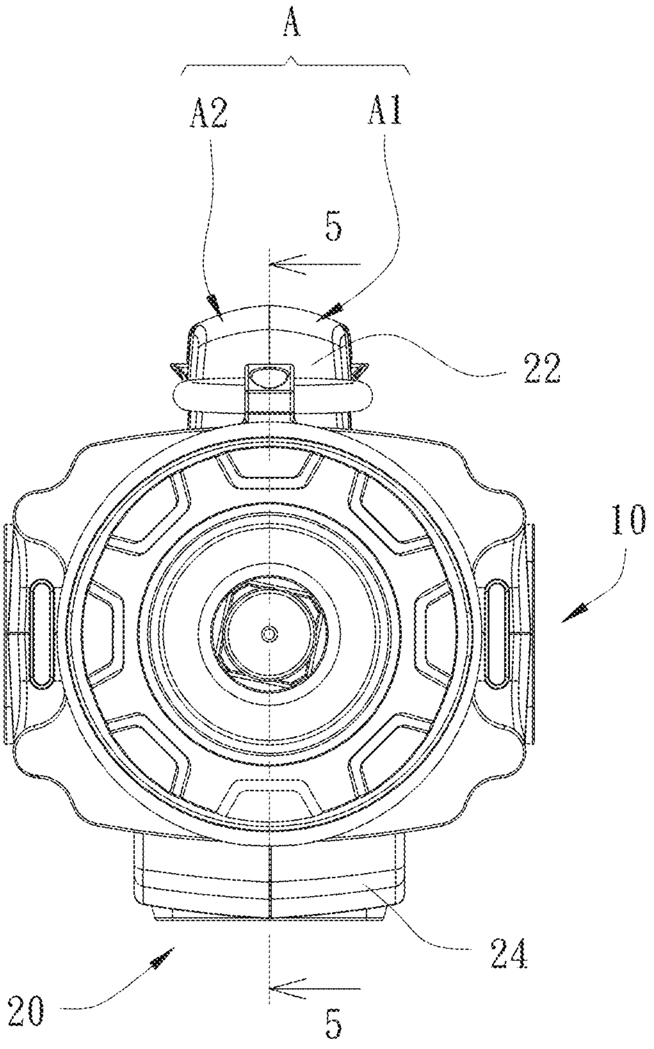
FIG. 4 is a front view of the impact tool according to the first embodiment of the present invention.
Figure 5:
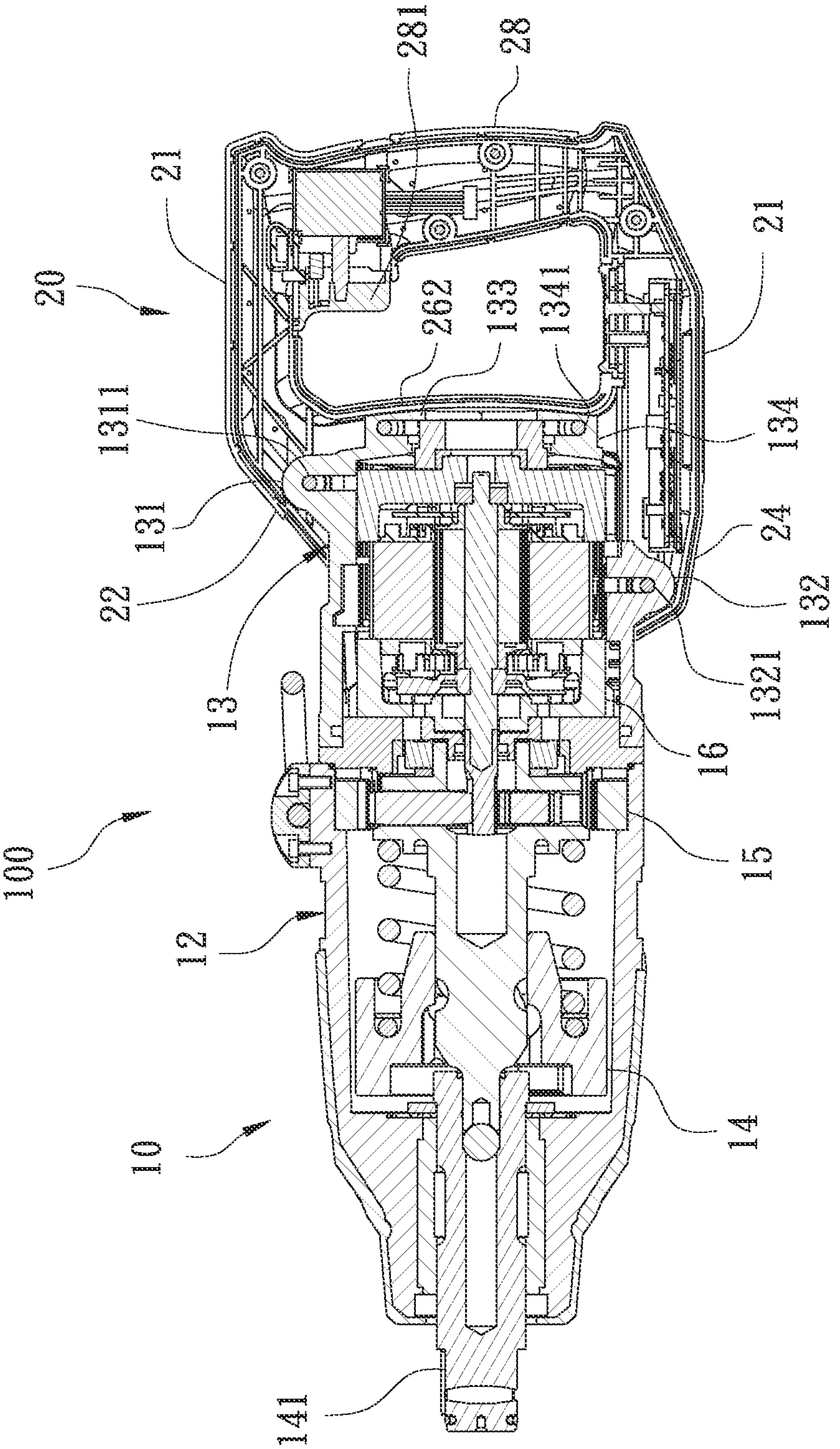
FIG. 5 is a sectional view along the 5-5 line in FIG. 4.
Figure 6:
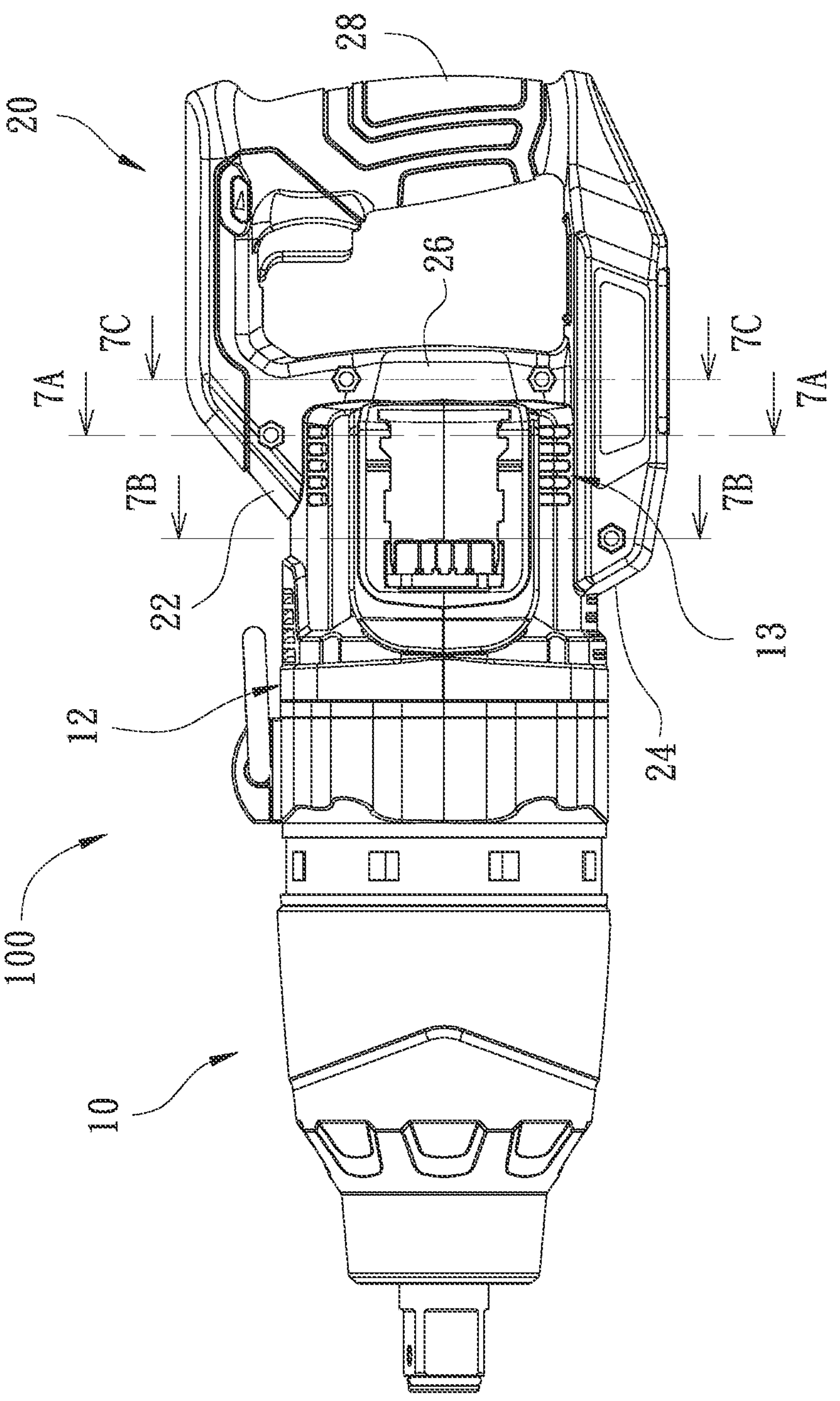
FIG. 6 is a side view of the impact tool according to the first embodiment of the present invention.
Figure 7A:
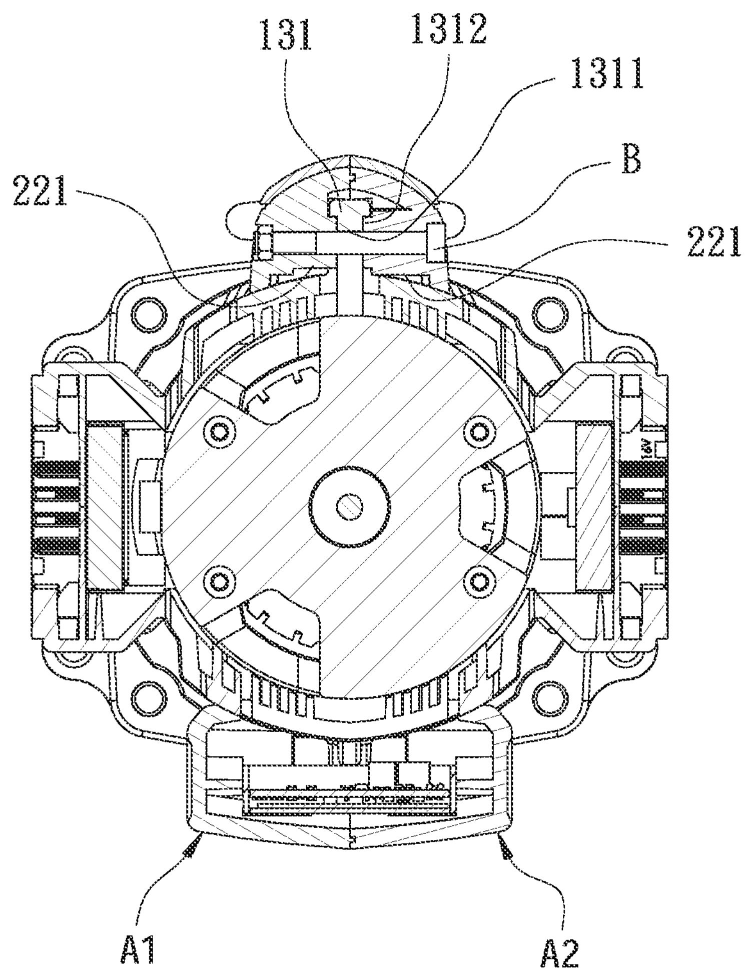
FIG. 7A is a sectional view along the 7A-7A line in FIG. 6.
Figure 7B:
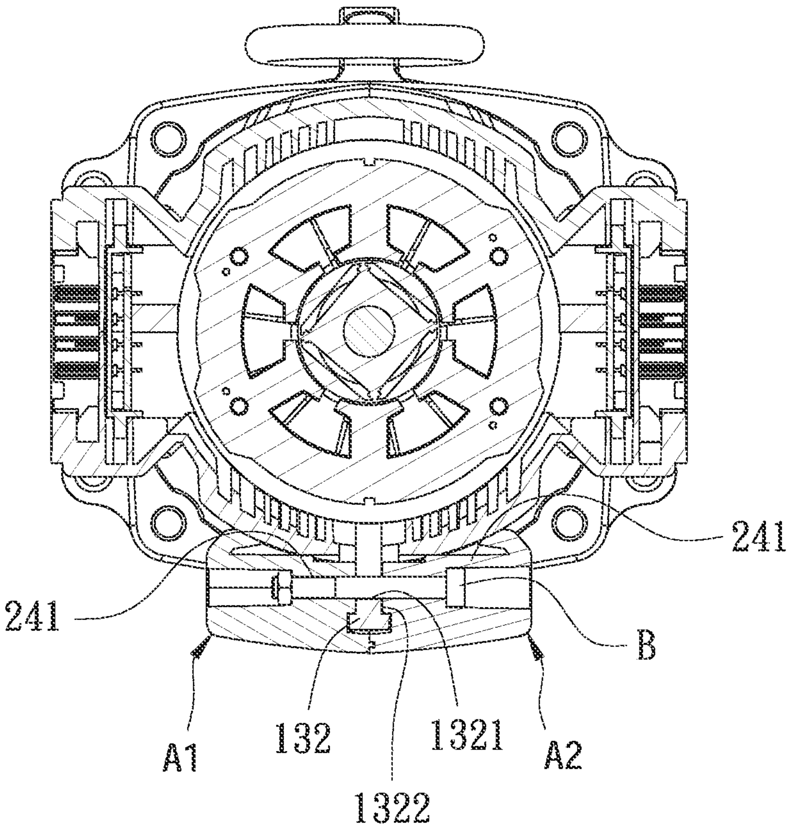
FIG. 7B is a sectional view along the 7B-7B line in FIG. 6.
Figure 7C:
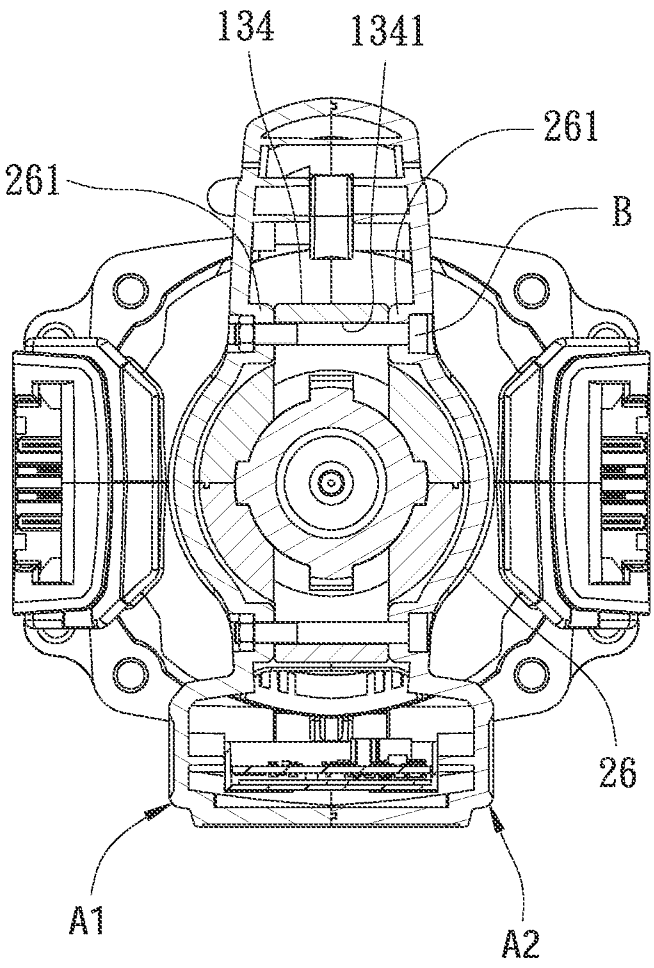
FIG. 7C is a sectional view along the 7C-7C line in FIG. 6.

According to the first embodiment of the present invention, the gun-type handle device 20 is engaged with the engaging portion 13 of the impact tool main body 10 to form the gun-type impact tool. Referring to FIG. 1 and FIG. 2, when the gun-type impact tool 100 having the exchangeable handle structure is used, the handle 28 is held, and the output head 141 on a front end of the impact tool main body 10 is engaged with a sleeve for driving the sleeve to tighten a fixing member located nearby, a nut as an example.

The present invention benefits from the structure that a left-half part and a right-half part of a front-end portion of the handle device 20 (including the top arm casing 22, the bottom arm casing 24, and the rear annular casing 26) are engaged with each other on the engaging portion 13, wherein the front-end portion of the handle device 20 is detachably mounted on the engaging portion 13 of the impact tool main body 10, and the top lug 131, the bottom lug 132, and the two penetrated portions 134 respectively on the top side and the bottom side of the annular body 133 are used as a supporting point when the handle device 20 is engaged with the impact tool main body 10, so that the handle device 20 and the impact tool main body 10 could be firmly engaged with each other. As different types of the handle device 20 could commonly share the same impact tool main body 10 for assembling different types of impact tools, such as a gun-type or an upright-type impact tool, only a rear half part of the handle device 20 that corresponds to the handle 28 is needed to change when the type of the handle 28 varies, instead of re-designing the impact tool main body 10 on the front of the handle device 20, thereby reducing the number of materials and molds during production and reducing the production cost as the type of the handle device 20 is changed upon the required demand for being flexibly mounted on the impact tool main body 10.

As shown in FIG. 2, FIG. 3, and FIG. 6 to FIG. 7C, the top lug 131 is connected to a rear end of the middle of the top surface of the engaging portion 13, and the bottom lug 132 is connected to the middle of the bottom surface of the engaging portion 13, wherein in the front-rear direction, a position of the bottom lug 132 is closer to the motor 16 than a position of the top lug 131. A periphery of two ends of the first through hole 1311 respectively recesses along the left-right direction to form a first recess 1312. An inner end of each of the two top fixing cylinders 221 fits in one of the two first recesses 1312 for positioning. A periphery of two ends of the second through hole 1321 respectively recesses along the left-right direction to form a second recess 1322. An inner end of each of the two bottom fixing cylinders 241 fits in one of the two second recesses 1322 for positioning. In this way, the fixing members B respectively pass through the two top fixing cylinders 221 and the top lug 131, and the two bottom fixing cylinders 241 and the bottom lug 132 of the left casing A1 and the right casing A2 for engaging the bottom arm casing 24 and the top arm casing 22 of the handle device 20 on the left side and the right side of the top lug 131 and the left side and the right side of the bottom lug 132 in a more stable way.

A bottom periphery of the top arm casing 22 abuts against the top surface of the engaging portion 13, and a top periphery of the bottom arm casing 24 abuts against the bottom surface of the engaging portion 13. A contour of a left side and a right side of the rear annular casing 26 is the same as a contour of a left side and a right side of the annular body 133 and the two penetrated portions 134, so that the left side and the right side of the annular body 133 and the two penetrated portions 134 contact an inner wall surface of the left side and the right side of the rear annular casing 26. The rear annular casing 26 has a rear plate portion 262 located directly behind the annular body 133 and abutting against a rear surface of the annular body 133 and the two penetrated portions 134 for positioning, increasing an area of the handle device 20 contacting the engaging portion 13, thereby increasing the stability of the engaging structure between the handle device 20 and the engaging portion 13.

Two connecting casings 21 (i.e., a top connecting casing and a bottom connecting casing) respectively extend rearward from a top side and a bottom side of the rear annular casing 26. In the current embodiment, the handle 28 is a vertical casing. A top portion and a bottom portion of the handle 28 respectively connected to a rear end of one of the two connecting casings 21. The triggering member 281 passes through a top side of a front surface of the handle 28. The top arm casing 22, the bottom arm casing 24, the rear annular casing 26, the two connecting casings 21, and the handle 28 are connected to form the casing A. A left-half part of the casing A is classified as the left casing A1, and a right-half part of the casing A is classified as the right casing A2. A left-half part of the top arm casing 22, a left-half part of the bottom arm casing 24, a left-half part of the rear annular casing 26, a left-half part of the two connecting casings 21, and a left-half part of the handle 28 form the left casing A1, and a right-half part of the top arm casing 22, a right-half part of the bottom arm casing 24, a right-half part of the rear annular casing 26, a right-half part of the two connecting casings 21, and a right-half part of the handle 28 form the right casing A2. A plurality of fixing members B is provided to respectively pass through a left side and a right side of the top portion, a middle, and the bottom portion of the handle 28, making a rear half part of the left casing A1 and the right casing A2 be firmly engaged.

The bottom arm casing 24, the bottom side of the rear annular casing 26, and the bottom connecting casings 21, jointly form a control circuit room 23 therein. A control board 231 is disposed in the control circuit room 23, and is electrically connected to the motor 16 and the triggering member 281, thereby the motor 16 could be activated through the control board 231 when the triggering member 281 is pressed. A top surface of the bottom connecting casing 21 has a panel opening 25, wherein a state display panel 251 fits in the panel opening 25, is electrically connected to the control board 231, and is adapted to display values of states, such as electricity and torque.

Figure 8:
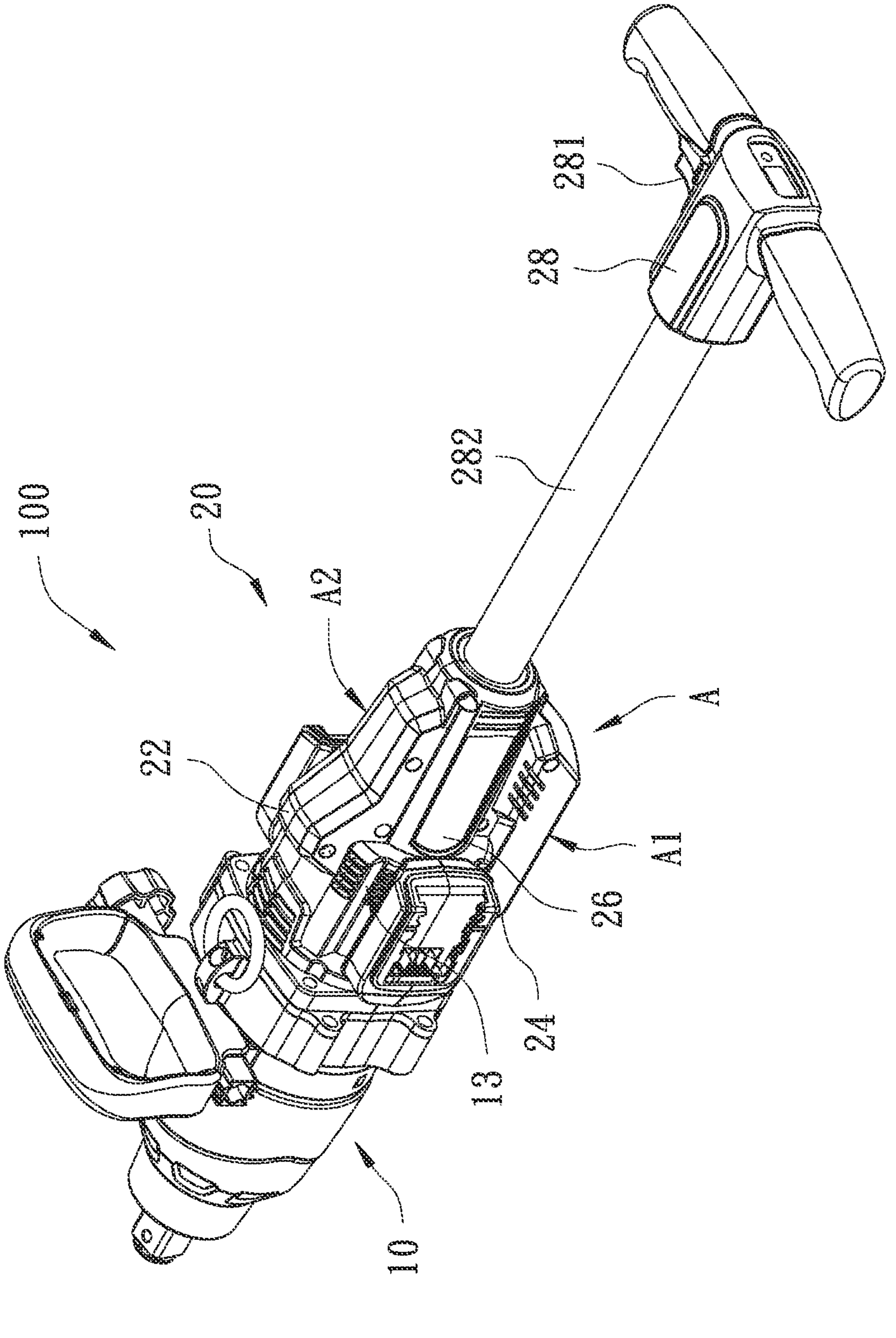
FIG. 8 is a perspective view of the impact tool according to a second embodiment of the present invention.
Figure 9:
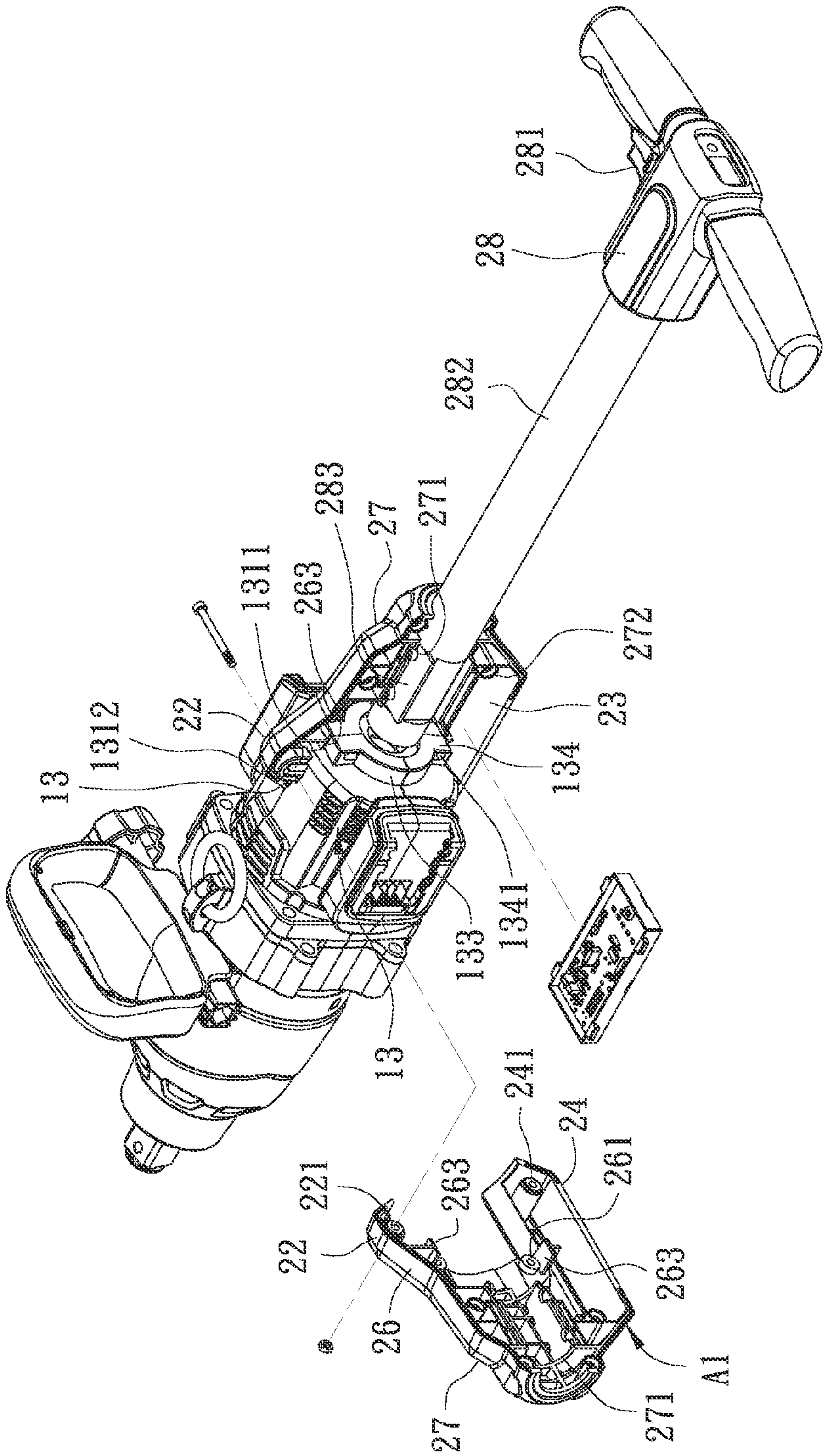
FIG. 9 is a schematic view, showing the left casing according to the second embodiment of the present invention being exploded.
Figure 10:
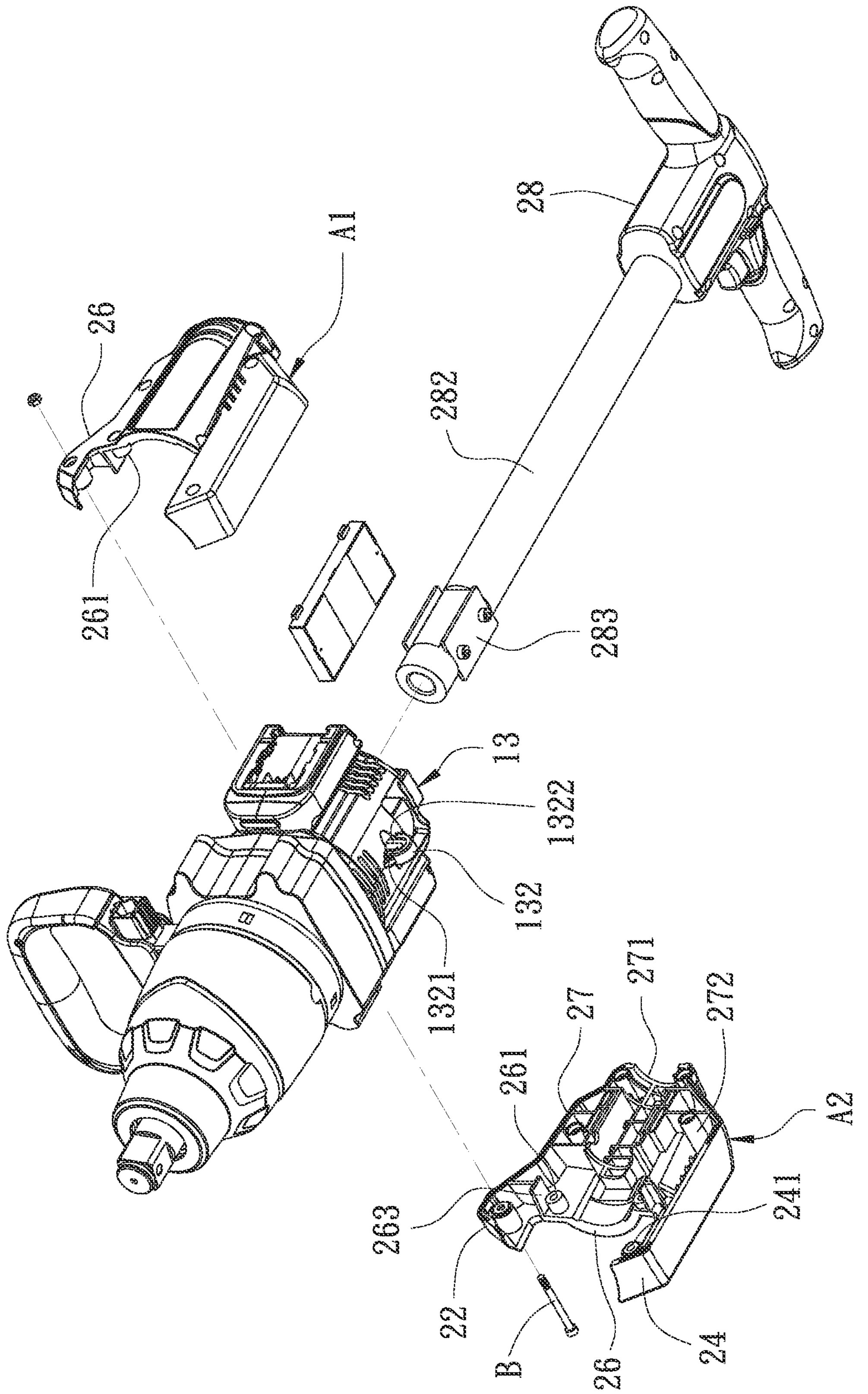
FIG. 10 is a schematic view, showing the handle device according to the first embodiment of the present invention being exploded.

In the present invention, apart from the gun-type handle device 20, the handle device 20 could be the upright type. An impact tool 100 having an exchangeable handle structure according to a second embodiment of the present invention is illustrated in FIG. 8 to FIG. 10, wherein the structure of the impact tool main body 10 in the second embodiment is the same as the impact tool main body 10 in the first embodiment, and the detachable engaging structure between the front-end portion of the handle device 20 and the impact tool main body 10 in the second embodiment is the same as that of the first embodiment as well. The main difference between the second embodiment and the first embodiment is that the handle 28 of the handle device 20 has an extending rod, and the handle 28 and the casing A are not monolithic.

In the second embodiment, the handle device 20 similarly includes a left casing A1 and a right casing A2 that are engaged with each other to form a casing A, wherein the casing A has a top arm casing 22, a bottom arm casing 24, and a rear annular casing 26 connected between a rear end of the top arm casing 22 and a rear end of the bottom arm casing 24. Two restricting plates 263 are respectively provided on a top side and a bottom side of the rear annular casing 26. A sleeving casing 27 extends rearward from the rear annular casing 26 and forms a sleeving groove 271 extending along the front-rear direction therein. A left-half part of the top arm casing 22, a left-half part of the bottom arm casing 24, a left-half part of the rear annular casing 26, and a left-half part of the sleeving casing 27 form the left casing A1, and a right-half part of the top arm casing 22, a right-half part of the bottom arm casing 24, a right-half part of the rear annular casing 26, and a right-half part of the sleeving casing 27 form the right casing A2.

The top arm casing 22 has an opening bottomward, covers the top side of the engaging portion 13 and the top lug 131, and has two top fixing cylinders 221 therein, wherein the two top fixing cylinders 221 are respectively disposed in the left casing A1 and the right casing A2, and respectively fit in one of the two first recesses 1312 to respectively abut against the left side and the right side of the top lug 131. The bottom arm casing 24 has an opening upward, covers the bottom side of the engaging portion 13 and the bottom lug 132, and has two bottom fixing cylinders 241 therein. The two bottom fixing cylinders 241 are respectively disposed in the left casing A1 and the right casing A2, and respectively fit in one of the two second recesses 1322 to respectively abut against the left side and the right side of the bottom lug 132.

The rear annular casing 26 has an opening frontward. A contour of a left side and a right side of the rear annular casing 26 is the same as the contour of the left side and the right side of the annular body 133 and the two penetrated portions 134. The rear annular casing 26 is adapted to receive the annular body 133 and the two penetrated portions 134 therein and has two pairs of rear fixing cylinders 261 therein, wherein each pair of rear fixing cylinders 261 is respectively disposed in the left casing A1 and the right casing A2, and respectively abuts against the left side and the right side of one of the two penetrated portions 134. One of the two restricting plates 263 abuts against a top surface of one of the two penetrated portions 134 on a top, and the other restricting plate 263 abuts against a bottom surface of the other penetrated portion 134 on a bottom. A top side and a bottom side of the sleeving casing 27 respectively have a plurality of pairs of assembling fixing cylinders 272. Each pair of the assembling fixing cylinders 272 is respectively disposed in the left casing A1 and the right casing A2.

The bottom arm casing 24, a bottom side of the rear annular casing 26, and a bottom side of the sleeving casing 27 jointly form a control circuit room 23 therein. A control board 231 is disposed in the control circuit room 23 and is electrically connected to the motor 16 of the impact tool main body 10. A plurality of fixing member B respectively passes through the two top fixing cylinders 221 and the first through hole 1311, the two bottom fixing cylinders 241 and the second through hole 1321, each pair of rear fixing cylinders 261 and the corresponding third through hole 1341, and each pair of assembling fixing cylinders, thereby making the left casing A1 and the right casing A2 firmly engaged with the engaging portion 13 of the impact tool main body 10. An extending rod 282 extends from a front end of the handle 28. A front-end portion of the extending rod 282 forms a fitting portion 283 that is non-circular, wherein the fitting portion 283 fits in the sleeving groove 271 of the sleeving casing 27 for fixing. A triggering member 281 passes through the handle 28 and is electrically connected to the control board 231, thereby could control the motor 16 of the impact tool main body 10 to activate.

As shown in FIG. 8, the upright-type impact tool 100 having the exchangeable handle structure is formed by assembling the upright-type handle device 20 with the engaging portion 13 of the impact tool main body 10. Through connecting the extended extending rod 282 to the handle 28, a user could hold the handle 28 to manipulate the impact tool main body 10, so that upon tightening a fixing member at a low position, for example, a nut of a rail, the user could manipulate the impact tool main body 10 in a standing posture, saving the effort of bending the waist and avoiding the injury of the waist as there is no need to bend the waist.

It must be pointed out that the embodiments described above are only some preferred embodiments of the present invention. All equivalent structures which employ the concepts disclosed in this specification and the appended claims should fall within the scope of the present invention.

What is claimed is:

1. An impact tool having an exchangeable handle structure, comprising:

an impact tool main body having an outer casing, wherein an impact mechanism, a reducer, and a motor are engaged in the outer casing in order along a front-rear direction from front to back; a front end of the impact mechanism is engaged with an output head forwardly penetrating out of the outer casing; a rear-end portion of the outer casing forms an engaging portion, wherein a middle of a top surface of the engaging portion has a top lug, and a middle of a bottom surface of the engaging portion has a bottom lug; the top lug has a first through hole, and the bottom lug has a second through hole; a rear-end surface of the engaging portion has an annular body, wherein two penetrated portions respectively extend upward from a middle of a top side and extend downward from a middle of a bottom side of the annular body, and respectively have a third through hole; and a handle device having a top arm casing, a bottom arm casing, and a rear annular casing connected between the top arm casing and the bottom arm casing; a left-half part of the top arm casing, a left-half part of the bottom arm casing, and a left-half part of the rear annular casing are classified as a left casing, and a right-half part of the top arm casing, a right-half part of the bottom arm casing, and a right-half part of the rear annular casing are classified as a right casing for being engaged with the left casing; the rear annular casing is connected to a handle, wherein a triggering member is electrically connected to the motor, is adapted to control the motor, and is provided on the handle; the top arm casing covers a top side of the engaging portion and the top lug and has two top fixing cylinders therein, wherein the two top fixing cylinders respectively abut against a left side and a right side of the top lug; the bottom arm casing covers a bottom side of the engaging portion and the bottom lug and has two bottom fixing cylinders therein, wherein the two bottom fixing cylinders respectively abut against a left side and a right side of the bottom lug; the rear annular casing is adapted to receive the annular body and the two penetrated portions therein and has two pairs of rear fixing cylinders; each pair of rear fixing cylinders abuts against a left side and a right side of one of the two penetrated portions; a plurality of fixing members respectively passes through the two top fixing cylinders and the first through hole, the two bottom fixing cylinders and the second through hole, and each pair of rear fixing cylinders and the corresponding third through hole for engaging.

2. The impact tool as claimed in claim 1, wherein a periphery of two ends of the first through hole respectively forms a first recess, and an inner end of each of the two top fixing cylinders fits in one of the two first recesses for positioning; a periphery of two ends of the second through hole respectively forms a second recess, and an inner end of each of the two bottom fixing cylinders fits in one of the two second recesses for positioning.

3. The impact tool as claimed in claim 2, wherein the top surface and the bottom surface of the engaging portion are respectively a curved surface, and the rear-end surface of the engaging portion is a vertical surface; the top lug is connected to a rear end of the middle of the top surface of the engaging portion, and the bottom lug is connected to a position of the middle of the bottom surface of the engaging portion that is closer to the motor in the front-rear direction than the top lug.

4. The impact tool as claimed in claim 3, wherein a bottom periphery of the top arm casing abuts against the top surface of the engaging portion, and a top periphery of the bottom arm casing abuts against the bottom surface of the engaging portion; a contour of a left side and a right side of the rear annular casing is the same as a contour of a left side and a right side of the annular body and the two penetrated portions.

5. The impact tool as claimed in claim 1, wherein the rear annular casing has a rear plate portion located directly behind the annular body and abutting against a rear surface of the annular body and the two penetrated portions.

6. The impact tool as claimed in claim 5, wherein two connecting casings respectively extend rearward from a top side and a bottom side of the rear annular casing; the handle is a vertical casing and is connected to a rear end of each of the two connecting casings; the triggering member passes through a top side of a front surface of the handle; the two connecting casings, the handle, the rear annular casing, the top arm casing, and the bottom arm casing are connected to form a casing, wherein a left-half part of the casing is classified as the left casing, and a right-half part of the casing is classified as the right casing; a left-half part of the top arm casing, a left-half part of the bottom arm casing, a left-half part of the rear annular casing, a left-half part of the two connecting casings, and a left-half part of the handle form the left casing, wherein one of the two top fixing cylinders, one of the two bottom fixing cylinders, and a left-half part of each pair of rear fixing cylinders are disposed in the left casing, a right-half part of the top arm casing, a right-half part of the bottom arm casing, a right-half part of the rear annular casing, a right-half part of the two connecting casings, and a right-half part of the handle form the right casing, wherein the other top fixing cylinder, the other bottom fixing cylinder, and a right-half part of each pair of rear fixing cylinders are disposed in the right casing.

7. The impact tool as claimed in claim 6, wherein the bottom arm casing, the bottom side of the rear annular casing, and one of the two connecting casings on a bottom, jointly form a control circuit room; a control board is disposed in the control circuit room and is electrically connected to the motor and the triggering member; a top surface of the connecting casing on the bottom has a panel opening; a state display panel fits in the panel opening and is electrically connected to the control board.

8. The impact tool as claimed in claim 1, wherein two restricting plates are respectively provided on a top side and a bottom side of the rear annular casing; one of the two restricting plates abuts against a top surface of one of the two penetrated portions on a top for positioning, and the other restricting plate abuts against a bottom surface of the other penetrated portion on a bottom for positioning.

9. The impact tool as claimed in claim 8, wherein a sleeving casing extends rearward from the rear annular casing; a sleeving groove extending along the front-rear direction is formed in the sleeving casing; the sleeving casing, the rear annular casing, the top arm casing, and the bottom arm casing are connected to form a casing, wherein a left-half part of the casing is classified as the left casing, and a right-half part of the casing is classified as the right casing; a right-half part of the top arm casing, a right-half part of the bottom arm casing, a right-half part of the rear annular casing, and a right-half part of the sleeving casing form the right casing, wherein one of the two top fixing cylinders, one of the two bottom fixing cylinders, and a right-half part of each pair of rear fixing cylinders are disposed in the right casing; a left-half part of the top arm casing, a left-half part of the bottom arm casing, a left-half part of the rear annular casing, and a left-half part of the sleeving casing form the left casing, wherein the other top fixing cylinder, the other bottom fixing cylinder, and a left-half part of each pair of rear fixing cylinders are disposed in the left casing; an extending rod extends from a front end of the handle; a front-end portion of the extending rod forms a fitting portion that is non-circular, wherein the fitting portion fits in the sleeving groove for fixing.

10. The impact tool as claimed in claim 9, wherein the bottom arm casing, the bottom side of the rear annular casing, and a bottom side of the sleeving casing jointly form a control circuit room therein; a control board is disposed in the control circuit room and is electrically connected to the motor and the triggering member.

* * * * *